United States Patent Office 3,151,104
Patented Sept. 29, 1964

3,151,104
POLYMERS OF PROPADIENE
Ivan Maxwell Robinson, Wilmington, Del., assignor to
E. I. du Pont de Nemours and Company, Wilmington,
Del., a corporation of Delaware
No Drawing. Filed May 22, 1958, Ser. No. 736,982
2 Claims. (Cl. 260—94.3)

This invention relates to linear, high molecular weight polymers of propadiene as novel compositions of matter.

This is a continuation-in-part of my patent application Serial Number 470,504 filed November 22, 1954 now abandoned.

Solid polymers have been prepared heretofore from olefins such as ethylene, propylene, and isobutylene, but prior to the present application there has been no disclosure of a normally solid, thermoplastic polymer of propadiene, or allene, as it is commonly called.

In the Journal of American Chemical Society, vol. 53, September 1931, pages 3245–3263, G. B. Heisig reports the treatment of allene with radon to produce a low molecular weight polymer in the form of a liquid. In the Journal of the American Chemical Society, vol. 55, March 1933, pages 1036–1047, S. C. Lind and Robert Livingston report the "photochemical polymerization" of allene to a viscous liquid or to a white film which sublimes. Both of these articles deal with extremely low molecular weight polymers which have no utility as a fabricable plastic of modern standards, e.g. plastics that may be extruded, molded, rolled or spun into films, fibers, and other shaped articles.

It is an object of this invention to provide a linear, high molecular weight polymer of propadiene, the polymer having an inherent viscosity of at least 0.3 measured at 90° C. in a solution of 0.02 gram of polymer solids in 100 ml. of decahydronaphthalene. It is another object of this invention to provide copolymers of propadiene and at least one other olefinic hydrocarbon having terminal ethylenic unsaturation. Still another object of this invention is to provide a process for polymerizing propadiene with or without additional comonomers.

It has now been found that a linear, normally solid polymer of propadiene can be prepared which is useful for the fabrication of shaped articles. Furthermore, it has been found that novel copolymers of propadiene and certain other olefinic materials may be prepared, and that such copolymers, likewise, are highly desirable for the fabrication of shaped articles.

The process for producing the above-described polymeric products is one in which propadiene, with or without other ethylenically unsaturated hydrocarbon olefins, is subjected to a temperature of 0°–300° C. and a pressure of 1–500 atmospheres in the presence of a polyvalent metal compound from the group consisting of the halides and esters of titanium, zirconium, cerium, vanadium, niobium, tantalum, chromium, molybdenum, tungsten, iron, and cobalt, and a sufficient amount of organometallic compound having at least one metal-to-hydrocarbon bond to reduce the valence of the said polyvalent metal to at most two, i.e. two or less.

Polypropadiene in its linear form bears an outward resemblance to polyethylene, but is somewhat stiffer. Linear polypropadiene is soluble in aromatic hydrocarbons, but is not soluble in these solvents after it has been cross-linked. The density of polypropadiene is about 1.06±.02. It is a linear polymer, and by X-ray diffraction can be shown to have a high or a low degree of crystallinity in the form in which it is initially obtained. The linear form of polypropadiene may be crosslinked by heating or other means to transform the polymer from a thermoplastic to a thermosetting compound.

Propadiene may polymerize into a linear polymer by more than one mechanism, and the polymer, therefore, may have more than one chemical structure. For example, there may be a carbon-to-carbon chain with a pendant methylene group on every other carbon atom, or there may be a carbon-to-carbon chain with a pendant vinyl group on every carbon atom, or there may be combinations of these groups in a single chain. These structures may be visualized as follows:

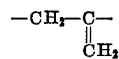

(pendant methylene group)

or,

(pendant vinyl group)

As might be expected, most linear polymers of propadiene will contain some of each of the above types of structure, or, in other words, polypropadiene will normally have some pendant methylene groups and some pendant vinyl groups. The polymer may form into a random mixture or a block mixture of the above groups. Such linear polymers as shown above may be cross-linked by heating or other means to change the soluble, linear polymer to an insoluble, crosslinked polymer.

This invention may be more fully understood by the illustrations given in the following examples. Parts and percentages are based on weight unless otherwise specified.

*Example 1*

Lithium aluminum tetra(ethyl cyclohexenyl) was prepared by reacting lithium aluminum hydride with vinyl cyclohexene at a temperature of 128° to 140° C., and the product is then diluted to 1 liter with cyclohexane or an aromatic hydrocarbon. A 500 ml., 3-neck flask, equipped with a stirrer, solid carbon dioxide condenser, and a gas inlet tube was charged with 0.01 mole titanium tetrachloride, 15 ml. of the lithium aluminum tetra(ethyl cyclohexenyl) mixture described above, and 100 ml. of cyclohexane. In a separate flask, attached to the gas inlet tube mentioned above, there was placed 20 grams of propadiene at about −75° C. The liquid propadiene was warmed to room temperature causing it to vaporize. Over a 15 min. period the propadiene vapors were passed into the stirred catalyst mixture in the 3-neck flask. The reaction was exothermic causing the temperature to rise to 50° C. The mixture was stirred for an additional hour and then treated with methanol and filtered. The precipitate was washed firstly with methanol, secondly with a mixture of methanol, water, and hydrogen chloride, and finally with acetone. After drying, there was recovered 3.3 grams of a white powdery linear polymer of propadiene, which was soluble in benzene. Films, pressed at 200° C. and 30,000 p.s.i. were very stiff and slightly discolored. The film was insoluble in benzene, toluene, or xylene and did not melt at 280° C. The polymer exhibited a density of 1.06. Infra red analysis indicated that the structure of the polymer was principally the one containing pendant methylene groups.

*Example 2*

Dry benzene (500 ml.) was introduced under a nitrogen atmosphere into a thoroughly dry reaction flask equipped with magnetic stirrer, gas inlet and outlet, and thermometer. The benzene was saturated at 30° C. with dried propadiene and a catalyst composed of 0.13 grams of luteocobaltic chloride and 0.50 ml. of 2.2 molar aluminum triisobutyl in cyclohexane was introduced. After 3 minutes, an additional 1.0 ml. of 2.2 molar aluminum triisobutyl was added. Thereafter polymer began to precipitate, the solution became somewhat viscous and the temperature increased rapidly. After 18 minutes, 50 ml. of ethanol was added to stop further polymerization, and the polymer was filtered. The polymer was washed three times in a Waring blender with 1:9 (by volume) HCl: ethanol solution, twice with ethanol, twice with water, twice with acetone, and then was placed in a vacuum oven at room temperature.

Infrared scans of the polymeric product showed strong absorption bands at 888 cm.$^{-1}$ and 993 cm.$^{-1}$, characteristic respectively of methylene groups and of vinyl groups in polypropadiene. The infrared measurements also indicated the presence of some cis-double bond unsaturation in the polymer chain. The inherent viscosity of this polymer was 1.01 in a solution containing 0.03 gram of polymer per 100 ml. of chlorobenzene at 90° C. A yield of 14.4 grams of polypropadiene was obtained. The material was pressed at 125° C. into a film, which upon two-way rolling had the following properties: modulus of elasticity, 112,970 p.s.i.; elongation, 53%; tenacity, 6220 p.s.i.; pneumatic impact strength, 2.02 kg.-cm./mil.

*Example 3*

By following the procedure of Example 2, 500 ml. of dry benzene was distilled into a reaction flask, and, after saturation at 25° C. with dry propadiene, a catalyst combination consisting of 0.05 ml. of vanadyl trichloride premixed with 5.0 ml. of 2.2 molar aluminum triisobutyl in cyclohexane was introduced. The reaction mixture rapidly set to a thick gel, to which a solution of 500 ml. of 1:1 HCl was added and vigorous stirring employed to break up the gel structure. There was obtained 16.3 grams of polypropadiene which appeared to be crystalline from X-ray diagrams and which had an X-ray melting point of 117–118° C. The polymer had an inherent viscosity of 5.54 measured at 80° C. in a solution of 0.01 gram of polymer solids in 100 ml. of bromobenzene. The polymer showed strong infrared absorption at 888 cm.$^{-1}$ and only slight absorption at 993 cm.$^{-1}$, indicating that the pendant groups were, for the most part, methylene groups. The polymer was pressed into a film at 120° C. which was insoluble in cyclohexane at room temperature and at 60° C., but it was partly soluble in toluene at 100° C. The solution tests were made on a mixture of 1 part by weight of polymer in 999 parts of solvent.

*Example 4*

By following the procedure of Example 2, dry propadiene was bubbled through 500 ml. of freshly distilled cyclohexane containing 0.025 ml. of titanium tetrachloride and three successive additions of 0.50 ml. portions of 2.2 molar aluminum triisobutyl in cyclohexane. The polypropadiene product showed strong infrared absorption at 888 cm.$^{-1}$ and 993 cm.$^{-1}$. The ratio of pendant methylene groups to pendant vinyl groups was calculated to be approximately 3.74. The inherent viscosity of the product was 0.58 measured at 90° C. in a solution of 0.02 gram of polymer solids in 100 ml. of decahydronaphthalene.

*Example 5*

By following the procedure of Example 2, dried propadiene was bubbled through 500 ml. of dried benzene containing 0.15 gram of ferric bromide and 0.75 ml. of 2.2 molar aluminum triisobutyl in cyclohexane. After 24 minutes the reaction was stopped by addition of 50 ml. of ethanol and the polymer was isolated as described in Example 2. The yield of polymer was 7.7 grams. Infrared analysis showed a ratio of pendant methylene groups to pendant vinyl groups of approximately 7.8. The polymer had an inherent viscosity of 2.55 measured at 90° C. in a solution of 0.1 gram of polymer solids in 100 ml. of decahydronaphthalene.

*Example 6*

By following the procedure of Example 2, 400 ml. of dried tetrahydrofuran was saturated with dried propadiene, after which, there was added 0.05 ml. of vanadyl trichloride and 2.0 ml. of 1 molar aluminum triisobutyl in cyclohexane. Two additional 0.025 ml. portions of vanadyl trichloride and an additional 7.0 ml. of aluminum triisobutyl were subsequently added. After 1½ hours, 40 ml. of ethanol were added and the product isolated. There was obtained 0.5 gram of polypropadiene product which was indicated to be somewhat crystalline by X-ray analysis. Infrared analysis showed absorption at 888 cm.$^{-1}$ and 993 cm.$^{-1}$ from which the ratio of pendant methylene groups to pendant vinyl groups was calculated to be approximately 6.6. The inherent viscosity of this product was 0.42 measured at 90° C. in a solution of 0.02 gram of polymer solids in 100 ml. of decahydronaphthalene.

*Example 7*

By following the procedure of Example 2, 400 ml. of dried dioxane was saturated with dry propadiene, after which, a total of 0.20 ml. of vanadyl trichloride and 20 ml. of 2.2 molar aluminum triisobutyl in cyclohexane were made by successive additions of small portions of these materials. After 45 minutes, 150 ml. of ethanol was added. The white precipitate which formed was filtered off, washed in a Waring blender successively with a volume ratio of 1:9 HCl:ethanol, then with ethanol, and finally with acetone to recover purified polypropadiene. X-ray analysis of the dried polypropadiene indicated it to be highly crystalline, and infrared analysis indicated its ratio of pendant methylene groups to pendant vinyl groups to be approximately 4.03. The inherent viscosity of the polymer was 0.42 measured at 90° C. in a solution of 0.02 gram of polymer solids in 100 ml. of decahydronaphthalene.

*Example 8*

By following the procedure of Example 2, dry propadiene was bubbled through a reaction flask containing 200 ml. of distilled diphenyl ether containing 0.025 ml. of vanadyl trichloride and 1.50 ml. of 2.2 molar aluminum triisobutyl in cyclohexane. After 20 minutes, the solid product which formed was isolated and washed successively with 1:9 (by volume) HCl:ethanol solution, with ethanol, with water, and finally with acetone and then dried. A yield of 3.6 grams of polypropadiene was obtained which showed infrared absorption at 888 cm.$^{-1}$ and 993 cm.$^{-1}$ with a ratio of pendant methylene groups to pendant vinyl groups of approximately 2.65.

*Example 9*

By following the procedure of Example 2, dry propadiene was bubbled through 500 ml. of dry hexane containing 0.05 ml. of vanadyl trichloride and 2.0 ml. of 2.2 molar aluminum triisobutyl in cyclohexane while the temperature was maintained between 0° C. and 5° C. After 30 minutes the reaction was stopped and the polymer isolated, purified, and dried. The yield of polymer was 5.0 grams and the infrared analysis showed the characteristic absorption of the methylene and vinyl group in polypropadiene. X-ray analysis indicated the polymer to have a low degree of crystallinity. The inherent viscosity of this polymer was 0.83 measured at 90° C. in a solution of 0.02 gram of polymer solids in 100 ml. of decahydronaphthalene.

*Example 10*

By following the procedure of Example 2, dried propadiene was bubbled through 500 ml. of dry hexane containing .05 ml. of vanadyl trichloride and 1.0 ml. of 2.2 molar aluminum triisobutyl in cyclohexane while the temperature was maintained between 30 and 32° C. After 30 minutes, the reaction was stopped and the polymer was isolated. There was obtained 3.0 grams of polymer which showed by infrared analysis the characteristic absorption of the methylene and vinyl groups in polypropadiene. X-ray analysis showed the polymer to have a strong diffraction peak at 16°. The inherent viscosity of this polymer was 0.49 measured at 90° C. in a solution of 0.02 gram of polymer solids in 100 ml. of decahydronaphthalene.

*Example 11*

By following the procedure of Example 2, dried propadiene was bubbled through 500 ml. of dry hexane containing 0.05 ml. of vanadyl trichloride and 2.0 ml. of 2.2 molar aluminum triisobutyl in cyclohexane while the temperature was maintained between 60–64° C. The reaction was stopped after 30 minutes and the polymer isolated. There was obtained a yield of 1.1 grams of polymer which showed the characteristic absorption pattern of polypropadiene by infrared analysis. X-ray analysis showed the polymer to be highly crystalline and to have three typical diffraction peak patterns at 14.3°, 16.0°, and 17.7°. The polymer had an inherent viscosity of 0.48 measured at 90° C. in a solution of 0.02 gram of polymer solids in 100 ml. of decahydronaphthalene.

*Example 12*

By following the procedure of Example 2, dry propadiene was bubbled into 500 ml. of dry bromobenzene at 109–117° C. while successive additions of 0.05 ml. of vanadyl trichloride and 2 portions of 2.0 ml. of 2.2 molar aluminum triisobutyl in cyclohexane were made. Infrared analysis indicated a small concentration of pendant vinyl groups, and X-ray analysis of the polymer showed it to have a low degree of crystallinity. The polymer had an inherent viscosity of 0.80 measured at 90° C. in a solution of 0.02 gram of polymer solids in decahydronaphthalene.

*Example 13*

In order to determine the effect of crystallinity upon solubility, a series of experiments were carried out, in which 0.05 gram of polypropadiene, of a sufficiently small size to pass through a 40-mesh screen, was placed in a small test tube, after which there was added 2.0 ml. of bromobenzene and the test tube was placed in a heating bath. A small Pyrex rod was employed for stirring. Solubility was judged to be complete with disappearance of solid and gel and when no schlieren lines could be observed. Polypropadiene as described in Example 9, which had a low degree of crystallinity, was completely dissolved at 51° C. Polypropadiene as described under Example 11, which shows three diffraction peaks, dissolved between 74 and 83° C. while polypropadiene, as described in Example 10, which had a single well-defined diffraction peak, was not completely dissolved at 86° C.

*Example 14*

By following the procedure described in the previous examples for preparing polymers from propadiene, a copolymer was prepared by saturating 600 ml. of dry benzene at 25° C. with dry propadiene and ethylene, following which there was added 0.25 ml. of vanadyl trichloride and 2.0 ml. of a 2.2 molar aluminum triisobutyl in cyclohexane. An atmosphere of ethylene and propadiene was maintained over the reaction mixture during a 2-hour period, after which the reaction was terminated by addition of water, and the benzene and dissolved gases were evaporated off under reduced pressure. An examination of the copolymer by X-ray and infrared analysis showed the presence of units derived from both ethylene and propadiene. Infrared scans showed the molar proportions of propadiene to be approximately 60 mole percent and that of ethylene to be approximately 40 mole percent. X-ray analysis indicated that the copolymer was somewhat crystalline. A portion of the copolymer was pressed at 165° C. into a clear film. The copolymer had an inherent viscosity of 0.46 measured at 90° C. in a solution of 0.02 gram of copolymer solids in 100 ml. of decahydronaphthalene.

In a similar experimental run, a copolymer of propadiene and propylene was obtained using a combination of titanium tetrachloride and lithium aluminum tetraheptyl as a catalyst.

*Example 15*

A solution of 100 ml. of commercial styrene, which was not redistilled, and 300 ml. of freshly distilled benzene was saturated with dry propadiene and there was then introduced 0.05 ml. of vanadyl trichloride and 2.7 ml. of 2.2 molar aluminum triisobutyl in cyclohexane in four successive 0.7 ml. portions. The reaction was terminated at the end of two hours.

Infrared analysis indicated that the polymeric solid obtained was a copolymer composed of approximately 75 mole percent propadiene and 25 mole percent styrene. The X-ray analysis indicated that the copolymer was partially crystalline. The yield of copolymer was 7 grams and it had an inherent viscosity of 0.80 at 125° C. in a solution of 0.05 gram of copolymer solids in 100 ml. of alpha-chloronaphthalene.

*Example 16*

To a solution of 500 ml. of benzene saturated with propadiene and butadiene at 25° C. there was added 0.05 ml. of vanadyl trichloride and 1.25 ml. of 2.2 molar aluminum triisobutyl in cyclohexane. The atmosphere of propadiene and butadiene was maintained over the reaction mixture for 3 hours, after which the reaction was terminated and the polymer isolated. The presence of both propadiene and butadiene units in the copolymer was indicated by X-ray and infrared analyses. The infrared measurements indicated the proportion of propadiene to be approximately 70 mole percent and the proportion of butadiene to be 30 mole percent. The yield of copolymer was 9.5 grams and the X-ray analysis indicated it to be rather highly crystalline. The copolymer was pressed at 150° C. to form a film. The inherent viscosity of the copolymer was 0.74 measured at 90° C. in a solution of 0.02 gram of copolymeric solids in 100 ml. of decahydronaphthalene.

It is to be understood that the foregoing examples are illustrative, and that other methods of preparing polypropadiene may be employed.

It is particularly desirable that the linear polypropadiene of this invention be prepared by a polymerization process employing a coordination catalyst system. The term "coordination catalyst" wherever used in this description and in the appended claims is defined as a catalyst formed by the reaction of a reducible polyvalent metal compound, the metal component of the compound preferably being at a valence of 3 or higher, with an amount of a reducing agent sufficient to reduce the valence of the metal component to 2 or less. The preferred catalyst is one in which a polyvalent metal halide or a polyvalent metal ester is reacted with an organometallic reducing agent having at least one metal-to-hydrocarbon bond.

The polyvalent metal compound mentioned above as a part of the catalyst combination may be any reducible compound, such as a halide, an ester, an oxyhalide, or the like, of the elemental metals from the group consisting of Ti, Zr, Ce, V, Nb, Ta, Cr, Mo, W, Fe, and Co. The preferred compounds, because of their availability, are the halides and the oxyhalides of the above elemental metals. A polyvalent metal ester is a compound having the general formula $M_n(OR)_m$ where M is the elemental metal, OR is an oxahydrocarbon group in which the oxygen is bonded directly to the metal M, and $n$ and $m$ are integers. Specific examples of the polyvalent metal compounds included in the above definition are titanium tetrachloride, titanium tetrafluoride, zirconium tetrachloride, zirconium tetrafluoride, niobium pentachloride, vanadium tetrachloride, vanadyl trichloride, tantalum pentabromide, cerium trichloride, molybdenum pentachloride, tungsten hexachloride, cobaltic chloride, ferric bromide, tetra(2-ethylhexyl)-titanate, tetrapropyl titanate, titanium oleate, octylene glycol titanate, triethanolamine titanate, tetraethyl zirconate, tetra(chloroethyl) zirconate, and the like.

The reducing agent may be any of a variety of well-known materials such as metals, metal hydrides, metal alkyls, metal aryls, and the like. The preferred reducing agents are those organometallic compounds having at least one metal-to-hydrocarbon bond, the metal being bonded to a carbon atom of the hydrocarbon group. Specific examples of the preferred reducing agents are phenyl magnesium bromide, lithium aluminum tetraalkyl, aluminum trialkyl, dimethyl cadmium, diphenyl tin, and the like.

The exact composition of the "coordination catalyst" when it is in its active state, capable of polymerizing ethylenically unsaturated compounds is not known. However, it is known that when one of these polyvalent metal compounds in which the polyvalent metal is at a high valence state, e.g. 3, is mixed with a sufficient amount of an organometallic reducing agent to reduce the valence of the polyvalent metal to 2 or less, the polyvalent metal composition becomes a highly active polymerization catalyst. In this highly active state, the polyvalent metal composition is capable of causing ethylenically unsaturated monomers to polymerize to a high molecular weight linear polymer.

The reaction conditions of the polymerization process are extremely mild. Pressures of 1 to 500 atmospheres are normally employed. Temperatures of 0° to 300° C. are preferred. The most satisfactory results are obtained when the polymerization medium is free of moisture or other sources of hydroxyl groups, free of oxygen, and substantially free of ketones, esters, or aldehydes.

The polymeric product, whether it be a homopolymer or a copolymer of propadiene, must be sufficiently high in molecular weight to be useful as a plastic or elastomeric material. A convenient measure of molecular weight is a measure of inherent viscosity which is defined by L. H. Cragg in the Journal of Colloid Science, vol. 1, pages 261–9 (May 1946) as:

$$\text{Inherent viscosity} = \frac{\ln \text{relative viscosity}}{C}$$

where relative viscosity is the ratio of the solution viscosity to the solvent viscosity, and C is the concentration of solute in solution measured as grams of polymer per 100 ml. of solution. In the description of this invention, the minimum inherent viscosity of the high molecular weight polymers of propadiene is 0.3 as measured at 90° C. in a solution of 0.02 grams of polymer solids in 100 ml. of decahydronaphthalene. Pendant methylene and vinyl groups in the polymer of this invention may be detected by infrared analysis. Infrared scanning of the polymers of this invention is made by obtaining the spectrum of the polymer in the form of a film or a pellet using potassium bromide on a Perkin-Elmer Model 21 or 13 Spectrophotometer. Pendant methylene groups are associated with the absorption at 888 cm.$^{-1}$ and pendant vinyl groups are associated with the absorption at 993 cm.$^{-1}$.

Normally solid, linear polypropadiene and copolymers of propadiene have numerous important applications. They may be converted into shaped articles, such as films, fibers, filaments, rods, tubes, and molded articles of various shapes, blended with elastomers or other polymers, such as polyethylene, employed as a coating material, or cured into elastomeric materials. The polymers and copolymers may be crosslinked by heating, by treatment with acid catalysts, or by treatment with known free-radical catalysts, and they may be vulcanized by treatment with S or with $SO_2$ and a suitable catalyst according to methods known in the art of rubber chemistry.

Copolymers may be prepared from mixtures of propadiene and any other hydrocarbon comonomer having terminal ethylenic unsaturation. Examples of such comonomers include ethylene, propylene, butene-1, hexene-1, butadiene, 1,5-hexadiene, styrene, and the like. However, the preferred comonomers are the monoolefinic hydrocarbons having terminal ethylenic unsaturation, e.g. ethylene, propylene, butene-1, and styrene. The copolymers of this invention contain more than 35 mole percent of propadiene and less than 65 mole percent of one or more of the above ethylenically unsaturated monomers. The preferred copolymers of this invention contain at least 60 mole percent of propadiene and not more than 40 mole percent of the monoolefinic hydrocarbon having terminal ethylenic unsaturation. Copolymers may, of course, be random mixtures or block mixtures of propadiene units and the comonomer units. In general, the copolymer will contain the same proportionate amounts of monomeric units as did the original mixture of monomers prior to polymerization.

I claim:

1. The process of preparing a linear polypropadiene comprising subjecting propadiene to a temperature of 0° to 300° C. and a pressure of 1 to 200 atmospheres in the presence of a polyvalent metal compound selected from the group consisting of halides and esters of titanium, zirconium, cerium, vanadium, niobium, tantalum, chromium, molybdenum, and tungsten and a sufficient amount of an organometallic compound having at least one metal-hydrocarbon bond to reduce the valence of said polyvalent metal to two, and recovering a linear polypropadiene.

2. The process of preparing a linear polypropadiene comprising subjecting propadiene to a pressure of 1 to 200 atmospheres pressure and 0° to 300° C. in the presence of titanium tetrachloride and a sufficient amount of an organometallic reducing agent having at least one metal-hydrocarbon bond to reduce the valence of said titanium, at least in part, to two, and recovering a linear polypropadiene.

References Cited in the file of this patent

UNITED STATES PATENTS 2,905,645     Anderson et al. _____ Sept. 22, 1959

FOREIGN PATENTS 549,009     Italy _____ Oct. 4, 1956

OTHER REFERENCES

G. B. Heisig: (Journal of American Chemical Society, volume 53, September 1931, pages 3245–3263).

S. C. Lind and Robert Livingston: (Journal of American Chemical Society, volume 55, March 1933, pages 1036–1047).